(12) United States Patent
Lou (10) Patent No.: US 8,755,916 B2
(45) Date of Patent: *Jun. 17, 2014

(54) OPTIMIZED INTEGRATED CONTROLS FOR OXY-FUEL COMBUSTION POWER PLANT

(75) Inventor: Xinsheng Lou, West Hartford, CT (US)

(73) Assignee: Alstom Technology Ltd., Baden (CH)

( * ) Notice: Subject to any disclaimer, the term of this patent is extended or adjusted under 35 U.S.C. 154(b) by 502 days.

This patent is subject to a terminal disclaimer.

(21) Appl. No.: 12/962,368

(22) Filed: Dec. 7, 2010

(65) Prior Publication Data

US 2012/0143382 A1 Jun. 7, 2012

(51) Int. Cl.
*G05B 13/02* (2006.01)
*G05B 21/00* (2006.01)
*G01N 31/00* (2006.01)
*G06F 7/60* (2006.01)
*G06F 17/10* (2006.01)
*G06G 7/48* (2006.01)

(52) U.S. Cl.
USPC .......... 700/36; 700/44; 700/48; 700/55; 700/272; 700/273; 702/31; 702/32; 703/2; 703/6

(58) Field of Classification Search
USPC ......... 700/28–30, 32–34, 36, 37, 44–55, 266, 700/271–273; 702/22, 31, 32; 703/2, 6
See application file for complete search history.

(56) References Cited

U.S. PATENT DOCUMENTS

| | | | |
|---|---|---|---|
| 5,724,805 A * | 3/1998 | Golomb et al. | 60/783 |
| 5,781,432 A | 7/1998 | Keeler et al. | |
| 6,223,519 B1 * | 5/2001 | Basu et al. | 60/783 |
| 7,058,552 B2 * | 6/2006 | Stothert et al. | 703/2 |
| 7,654,320 B2 * | 2/2010 | Payton | 166/257 |
| 8,352,148 B2 * | 1/2013 | D'Amato et al. | 701/100 |
| 2007/0142975 A1 | 6/2007 | Piche | |
| 2009/0222108 A1 * | 9/2009 | Lou et al. | 700/29 |
| 2009/0222136 A1 * | 9/2009 | Lou | 700/272 |

FOREIGN PATENT DOCUMENTS

| | | |
|---|---|---|
| CN | 101517506 A | 8/2009 |
| CN | 101689050 A | 3/2010 |
| CN | 101872181 A | 10/2010 |
| EP | 2 182 283 | 5/2010 |

OTHER PUBLICATIONS

Qi Li et al., "Simulation and Optimization of Oxy-Fuel Gas Cycle Power Plant with CO2 Capture", 2011 Asia-Pacific Power and Energy Engineering Conference (APPEEC), Mar. 25-28, 2011, pp. 1-4.*

Tongshu Guo et al., "Dynamic modeling and control of the air separation unit in an IGCC power plant", 2009 International Conference on Sustainable Power Generation and Supply, Apr. 6-7, 2009, pp. 1-7.*

(Continued)

*Primary Examiner* — Crystal J Barnes-Bullock
(74) *Attorney, Agent, or Firm* — Buchanan Ingersoll Rooney PC (57) ABSTRACT

A control system for optimizing an oxy-fuel power plant comprises an optimizer in communication with the oxy-fuel power plant; the oxy-fuel power plant being operative to recycle carbon dioxide from a flue gas stream to a boiler; a control platform; the control platform being operative to control the oxy-fuel power plant; and a simulator; the simulator being operative to simulate performance of the oxy-fuel power plant.

22 Claims, 5 Drawing Sheets

(56) References Cited

OTHER PUBLICATIONS

Wei Li et al, "Optimization Model and PID Temperature Control System Design for CO2 Capture Process by CaO Carbonation—CaCO3 Calcination Cycles", 2010 Asia-Pacific Power and Energy Engineering Conference (APPEEC), Publication Year: 2010, pp. 1-4.*

International Search Report and the Written Opinion of the International Searching Authority for International Application PCT/US2011/059686, dated Jan. 17, 2012.

Mar. 19, 2014 Taiwanese Office Action issued in Taiwanese Application No. 100144939.

* cited by examiner

Figure 5 ly. In order to improve the efficiency of the functioning of the plant and in order to minimize the effect of changes in the electric load demands or the changes in carbon dioxide production, it is desirable to use control systems that can act in cooperation to improve energy generation while at the same time improving carbon dioxide sequestration.

OPTIMIZED INTEGRATED CONTROLS FOR OXY-FUEL COMBUSTION POWER PLANT

BACKGROUND

This disclosure relates to optimized integrated controls for an oxy-fuel combustion power plant. In particular, this disclosure relates to optimized integrated controls for an oxy-fuel pulverized coal power plant or an oxy-fuel circulating fluidized bed power plant.

Oxy-fuel combustion systems use oxygen instead of air for combustion of the primary fuel to produce a flue gas that comprises mainly water vapor and carbon dioxide. This results in a flue gas with carbon dioxide concentrations that are greater than 80 volume percent. While two thirds of the flue gas is recycled within the system, the remaining portion (consisting mainly of carbon dioxide and water vapor and small quantities of argon, nitrogen, nitrogen oxides, and sulfur oxides) is cleaned up, compressed and later transported to storage or to other applications.

Figure 1:
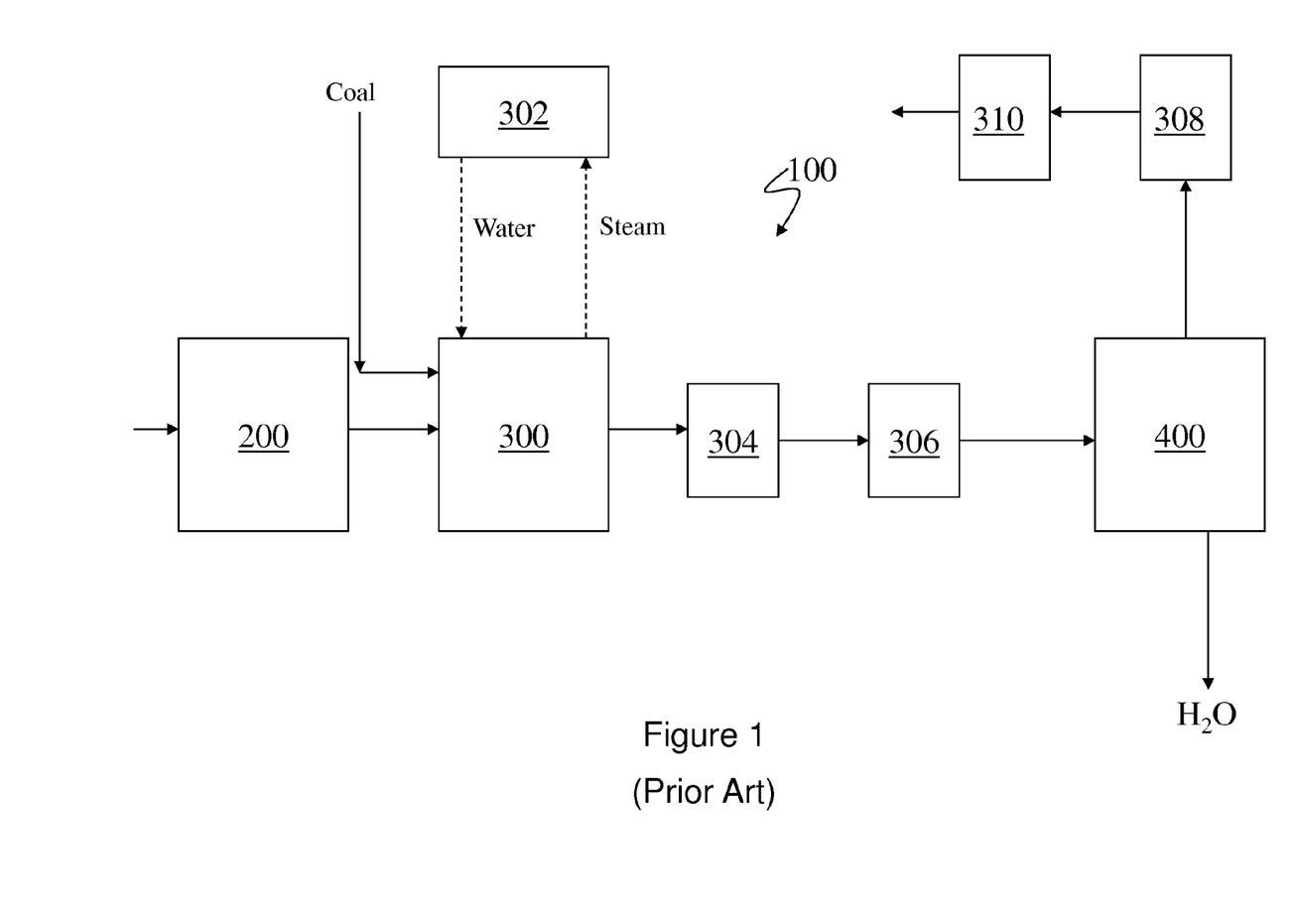
FIG. 1 depicts an exemplary power plant configured to permit oxy-firing.

The FIG. 1 depicts an exemplary power plant 100 configured to permit oxy-firing. The power plant 100 generally comprises an air separation unit 200, a boiler 300 and a flue gas treatment system 400. The air separation unit 200 is in fluid communication with the boiler 300 and the flue gas treatment system 400. The boiler 300 and the flue gas treatment system 400 lie downstream of the air separation unit, with the flue gas treatment system 400 lying downstream of the boiler 300. The air separation unit 200 separates outside air from nitrogen and delivers gas rich in oxygen to the boiler 300. The boiler 300 is in communication with a steam turbine 302 and supplies steam to the turbine 302 to drive it. Flue gases from the boiler 300 are discharged to a flue gas dryer 304 and to an electrostatic precipitator 306.

A portion of the dried and particulate-free flue gas that emanates from the electrostatic precipitator 306 is recycled to the boiler 300, where it is mixed with additional incoming air (that is rich of oxygen and free of nitrogen) and delivered to the boiler 300. The remaining portion of the flue gases (which are rich in carbon dioxide) that are not recycled are further treated to remove moisture and are then subjected to compression in a compressor 308 and sequestration in a sequestration facility 310.

There are a number of new challenging issues associated with deploying oxy-fuel combustion in a power plant. Some of these problems are listed below.

The use of oxy-fuel combustion systems in a power plant to enable the easier capture of carbon dioxide results in additional energy consumption over comparative power plants that do not use oxy-fuel combustion. This additional energy consumption occurs primarily from energy consumption in the air separation unit (about 25 to about 30%) and from the flue gas recirculation (about 5 to about 10%). This increase in energy consumption results in a reduced output from the power plant.

As a result of using gas that is rich in oxygen, there is a change in combustion that occurs when the ratio of oxygen to the recycled-flue gas ratio is changed. This provides new challenges for controlling the power plant.

External disturbances to the plant system such as changes in the electric load demands or in carbon dioxide production will affect the air separation unit 200, the boiler 300 and the flue gas treatment system 400. Since the recycling of flue gases and the closed loop control of the power plant are interlinked with changes in the electric load demands or with carbon dioxide production, these changes cause changes to the functioning of the air separation unit 200, the boiler 300 and the flue gas treatment system 400.

SUMMARY

Disclosed herein is a control system for optimizing an oxy-fuel power plant, the control system comprising an optimizer in communication with the oxy-fuel power plant; the oxy-fuel power plant being operative to recycle carbon dioxide from a flue gas stream to a boiler; a control platform; the control platform being operative to control the oxy-fuel power plant; and a simulator; the simulator being operative to simulate performance of the oxy-fuel power plant.

Disclosed herein is a method comprising simulating a performance of an air separation unit, a boiler, a flue gas dryer, an electrostatic precipitator and/or a flue gas condenser, and a turbine generator in an oxy-fuel power plant, which is in communication with a power grid; generating a model of the performance of the air separation unit, the boiler, the flue gas dryer, the electrostatic precipitator and/or the flue gas condenser from the simulated performance; measuring an output of the air separation unit, the boiler, the flue gas dryer, the electrostatic precipitator and/or the flue gas condenser; and optimizing the performance of the air separation unit, the boiler, the flue gas dryer, the electrostatic precipitator and/or the flue gas condenser, and a turbine generator by comparing the simulated performance with actual performance.

DETAILED DESCRIPTION

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Disclosed herein is an integrated system for controlling an oxy-fuel combustion based carbon dioxide capture power plant that includes non-linear controllers and optimizers and that combines a steady state economic optimizer with a dynamic optimizer. The integrated system can be advantageously used in a variety of power plants and can be used to incorporate life extending controls, emission optimization, economic optimization and load ramping controls. It can also be used to include fault detectors that facilitate a fault control tolerant strategy for the entire power plant. In an exemplary embodiment, it can be used in an oxy-fuel carbon dioxide combustion plant.

Disclosed herein too is a method for controlling an oxy-fuel combustion based carbon dioxide capture power plant that includes non-linear controllers and optimizers. In one embodiment, the method comprises simulating the performance of an air separation unit, a boiler, a flue gas dryer, an electrostatic precipitator and/or a flue gas condenser, and a turbine generator in an oxy-fuel power plant that is in communication with a power grid. A model of the performance of the air separation unit, the boiler, the flue gas dryer, the electrostatic precipitator and/or the flue gas condenser and a turbine generator is generated from the simulated performance. The output of the air separation unit, the boiler, the flue gas dryer, the electrostatic precipitator and/or the flue gas condenser and a turbine generator are measured. The model is compared against the actual output and the performance of the air separation unit, the boiler, the flue gas dryer, the electrostatic precipitator and/or the flue gas condenser and a turbine generator is then optimized by comparing the simulated performance with actual performance.

The use of an integrated process optimization system in a power plant produces a number of advantages. By using optimizers that coordinate various features of the power plant including power generation processes, boiler design processes and plant layout, the efficiency of the power plant can be significantly improved and the negative impact of carbon dioxide capture can be minimized. In one embodiment, by using process optimizers between different parts of the plant that are integrated and commonly controlled and that communicate with one another, the negative impact of carbon dioxide capture can be controlled and minimized. In an exemplary embodiment, by optimizing processes that involve power generation such as oxygen production, coal feed, flue gas cleaning and recirculation in combination with processes that involve plant design such as boiler design and steam cycle layout, the negative impact of carbon dioxide capture can be significantly controlled and minimized.

Real time optimization of power generation processes will help the power plant maintain competitive margins by taking into account the unit dynamic performance as well as the changing market prices on electricity, fuels, sorbents, trade prices of major emissions (carbon dioxide, nitrogen oxide, sulfur dioxide, mercury, particulate matter, and the like) and component life extension which is related to maintenance costs.

Figure 2:
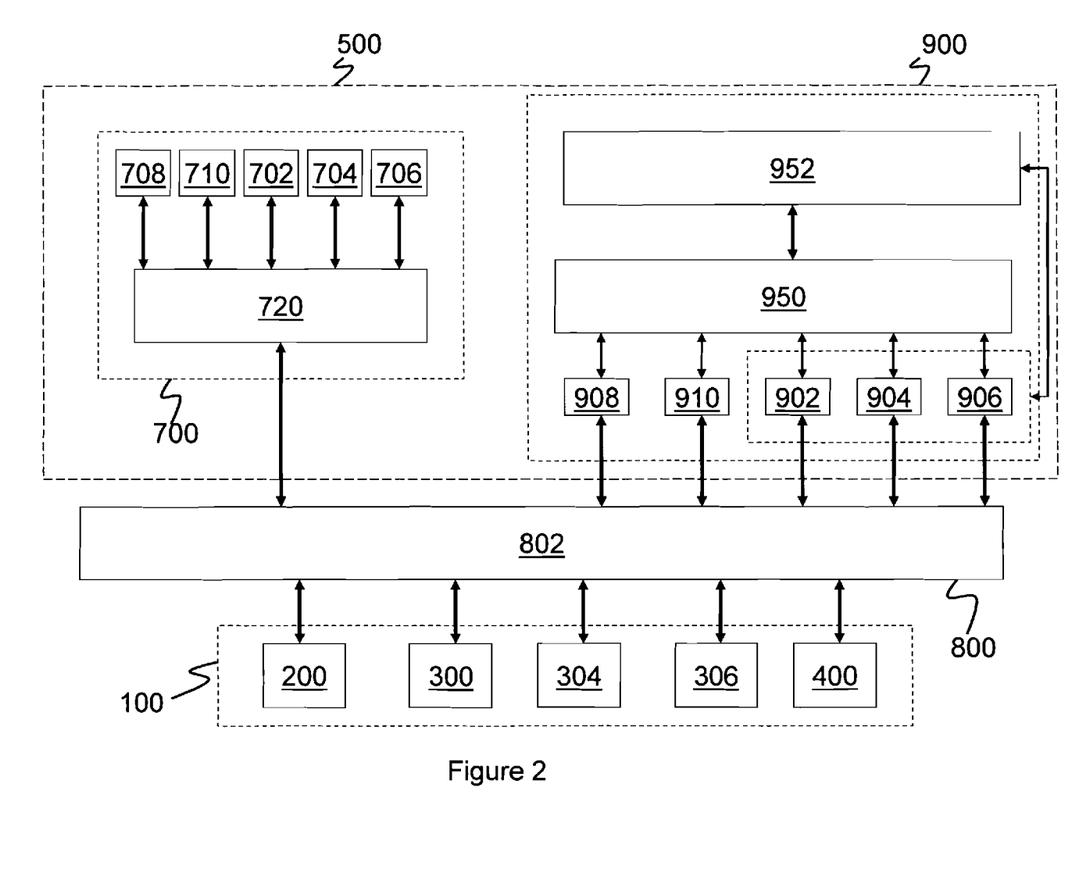
FIG. 2 reflects an exemplary oxy-fuel economic optimizer and control system for controlling and optimizing power plant performance when flue gases are recycled.

FIG. 2 reflects an exemplary oxy-fuel economic optimizer and control system 500 (hereinafter control system 500) for controlling and optimizing power plant performance when flue gases are recycled (i.e., in an oxy-fuel carbon dioxide combustion power plant). In one embodiment, the power plant may be a pulverized coal power plant or a circulating fluidized bed power plant. The control system 500 comprises a simulator 700 in communication with a distributed control system platform 800. The distributed control system platform 800 is in communication with a master controller and an optimizer 900. In one embodiment, the simulator 700, the distributed control system platform 800, and the optimizer 900 are in operative communication with one another. In an exemplary embodiment, the simulator 700, the distributed control system platform 800, and the optimizer 900 are in electrical communication with one another. The optimizer 900 comprises a plant economic optimizer 950 that communicates with a plant master controller 952. The economic optimizer is a multivariable optimizer.

The simulator 700 comprises a plurality of simulators that simulate the behavior of the components of the power plant shown in the FIG. 1. An air-separation unit simulator 708 simulates the performance of the air separation unit 200. The performance of the oxy-fuel-boiler 300 is simulated by the oxy-fuel boiler simulator 710. Back-end process simulators simulate the performance of the flue gas dryer 304, the electrostatic precipitator 306 and the flue gas condenser 400 respectively. A first simulator 702 simulates the performance of the flue gas dryer 304. A second simulator 704 simulates the performance of the electrostatic precipitator 306. A third simulator 706 simulates the performance of the flue gas condenser 400.

The first, second and third simulators 702, 704 and 706, the air-separation unit simulator 708 and the oxy-fuel boiler simulator 710 simulate performance of the respective components via first principle equations (e.g., mass, momentum, and energy balances) and via linear and non-linear models. The simulators may be steady-state process simulators or dynamic simulators. The modeling and simulation includes any combination of ordinary differential equations (ODEs), algebraic equations (AEs), and partial differential equations (PDEs). In addition, empirical modeling methods, e.g., neural networks (NN) such as nonlinear autoregressive network with exogenous inputs (NARX), nonlinear auto regressive moving average with exogenous inputs (NARMAX), wavelet network models, and Wiener-Hammerstein models, are used in a hybrid dynamic model structure that combines simplified first-principle models with data-driven models. Further, multivariate model predictive controls (MPC) using both linearized models and nonlinear models provide solutions to dynamic optimization. A master simulator 720 is in communication with each of the first, second and third simulators 702, 704 and 706, the air-separation unit simulator 708 and the oxy-fuel boiler simulator 710. The master simulator 720 is useful during setup of the slaves (i.e., the first, second and third simulators 702, 704 and 706, the air-separation unit simulator 708 and the oxy-fuel boiler simulator 710) and for inspection of the function of the slaves. It is generally used for testing and as a diagnostic tool for the slaves.

Each of the simulators (i.e., the first, second and third simulators 702, 704 and 706, the air-separation unit simulator 708 and the oxy-fuel boiler simulator 710) can be a dynamic simulator, which simulates the actual oxyfuel processes using advanced techniques. Specifically, the dynamic simulator may be a ROM (Reduced Order Model) based simulator.

The optimization process depicted in the FIG. 2 uses parallel process performance and control system design analyses. By using both a process performance simulator and a dynamic simulator, the optimized plant performance and operating parameters are predicted, evaluated and thereby effectively optimized. The process performance simulator includes, e.g., thermodynamic, thermo-economic, and emission predictions using theoretical and empirical models such as process models and/or regression models in design standards and NN models based on operational databases, but is not limited thereto.

The dynamic simulator includes first principle models, or alternatively, combined first principle and data driven empirical models, and/or wavelet network models, as well as control logic simulation modules, for example. For life extending controls, material models are included, thereby allowing material damage prediction and life extending control simulations.

With reference now once again to the FIG. 2, the distributed control system platform 800 controls the air separation unit 200, the boiler 300, the flue gas dryer 304, the electrostatic precipitator 306 and the flue gas condenser 400. The distributed control system platform 800 communicates with the optimizer 900. The optimizer 900 comprises plant economic optimizer 952 that communicates with a plant master controller 950. The plant optimizer 952 retrieves online data from distributed control system platform 800 and processes it for use in the prediction by the process models. The optimizer computes the optimal target values and passes them back to distributed control system platform 800 for real-time execution. The target values can either override the existing distributed control system platform 800 setpoints or add a bias to the existing setpoint to justify them to the newly computed target values. The operating constraints will be applied in the optimization calculation.

As noted above, the distributed control system 800 comprises a control system platform 802 that controls the air separation unit 200, the boiler 300, the flue gas dryer 304, the electrostatic precipitator 306 and the flue gas condenser 400; and/or turbine generation system (not shown). In one embodiment, the control system platform 802 may control the respective parts of the power plant 100 by individual control systems as shown in the FIG. 2. In another embodiment, a bundled controller may be used to control the air separation unit 200, the boiler 300, the flue gas dryer 304, the electrostatic precipitator 306 and the flue gas condenser 400.

The oxyfuel plant master controller 950 communicates with the model process controller 908 for the air separation unit 200 and with the model process controller 910 for the boiler 300. The oxyfuel plant master controller 950 also communicates with the respective optimizers i.e., the first optimizer (optimal controller) 902, the second optimizer (optimal controller) 904 and the third optimizer (optimal controller) 906 for the flue gas dryer 304, the electrostatic precipitator 306 and the flue gas condenser 400 respectively. The plant economic optimizer 952 also communicates with the plant master controller 950 and with the first optimizer 902, the second optimizer 904 and the third optimizer 906. Since the determination of the optimized plant performance and operating parameters may involve multiple iterations to choose among a number of design scenarios, additional optimizers (not shown) may be included such that both process performance and control system design are pre-optimized prior to optimization by the plant economic optimizer 952.

Figure 3:
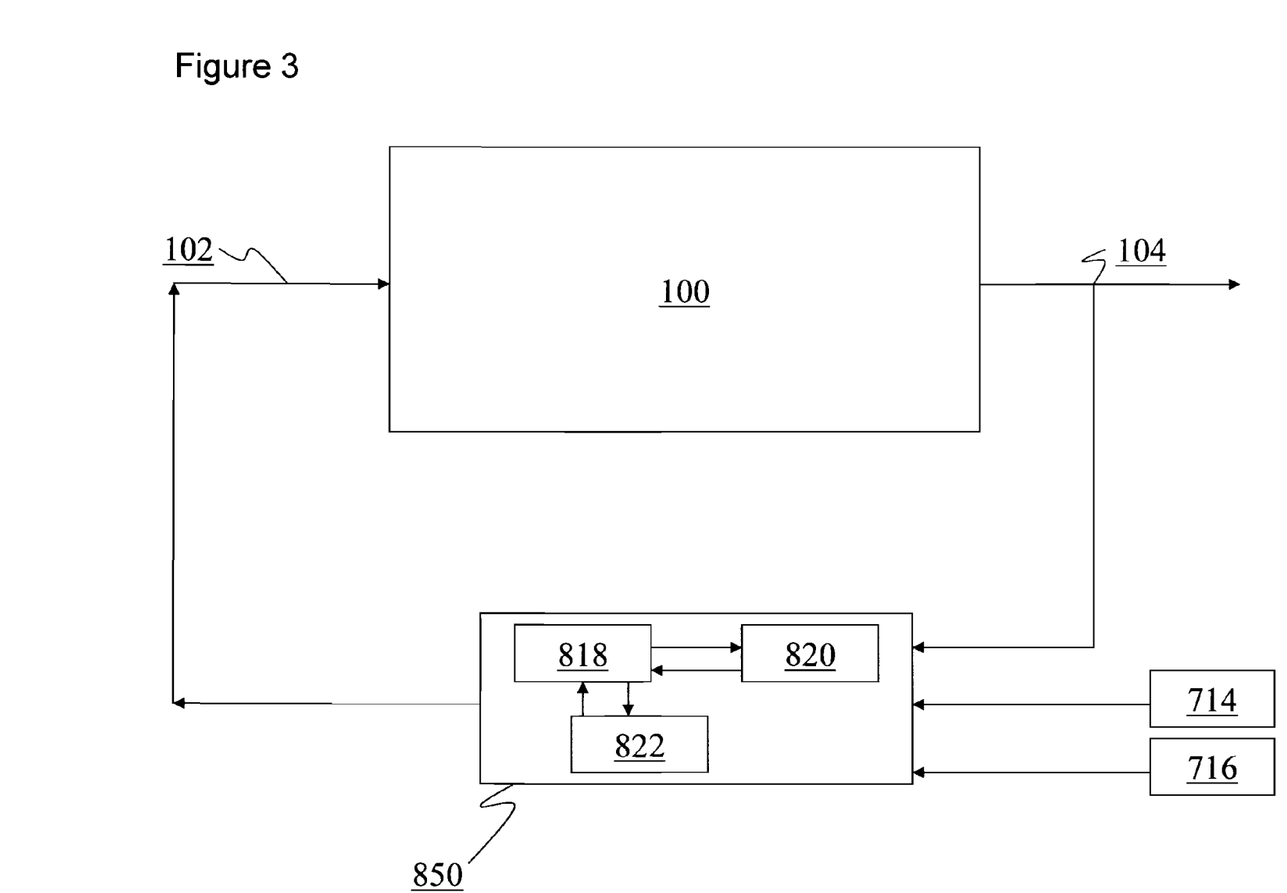
FIG. 3 reflects some embodiments of the operation of the model process controllers in an optimized oxy-fuel carbon dioxide combustion plant.
Figure 4:
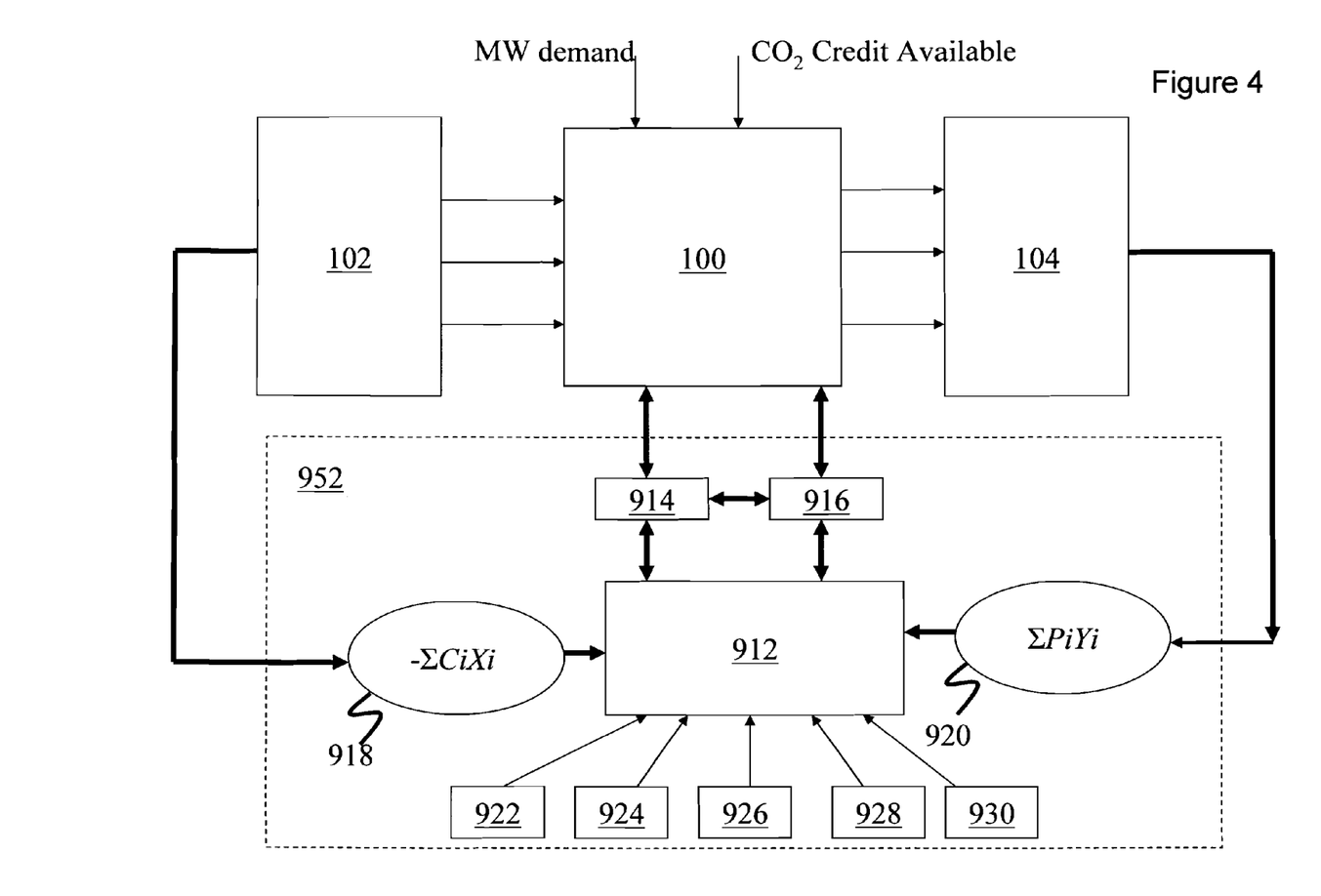
FIG. 4 depicts an exemplary embodiment of the oxy-fuel plant economic optimizer of the FIG. 2.

The FIGS. 3 and 4 reflect some embodiments of the operation of the model process controllers in an optimized oxy-fuel carbon dioxide combustion plant. In operation, the model process controller 850 receives oxyfuel process output parameters 104 from the power plant 100. The oxyfuel process output parameters 104 include, but are not limited to, load demand, power, and gas (e.g., $H_2$, $N_2$, $CO_2$ and/or syngas) flow rates. Using set points 714 and predetermined parameters 716, the model process controller 850 optimizes modeled plant parameters and provides an optimized oxyfuel process input control parameter 102 based thereon to the plant 100. In an exemplary embodiment, the optimized oxyfuel process input control parameter 102 is a solids transport inventory control variable, but alternative exemplary embodiments are not limited thereto. For example, the optimized oxyfuel process input control parameter 102 may be a reactor temperature control variable, a loop temperature control variable, a furnace temperature control variable, a load ramping control variable, a plant start-up control logic algorithm, a reactor pressure variable, a reactor differential pressure variable, a plant shut-down control logic algorithm, and a fuel/air/limestone/steam ratio, but alternative exemplary embodiments are not limited to the foregoing list.

The model process controller 850 comprises a model part 818, an estimator 820 and an optimizer 822. While the model process controller 850 of the FIG. 3 is in communication with the power plant 100, it can be in communication with any of the other smaller parts of the plant such as, for example the boiler or the air separation unit and can function to control these smaller parts of the plant. For example, the model process controller 850 can be the model process controller 908 for the air separation unit 200 and with the model process controller 910 for the boiler 300 as shown in the FIG. 1. Data communications can be done through the use of OPC (Object Linking and Embedding for Process Control) with the distribution control system platform, but not limited to this.

In one embodiment, the model process controller 850 can include linear or nonlinear dynamic modeling and simulation derived from first principle equations such as mass, momentum, and energy balances. Furthermore, empirical modeling methods such as nonlinear neural networks are used in a hybrid dynamic model structure which combines simplified first-principle models with data-driven models. In an exemplary embodiment, the model process controller leverages current plant control system components, e.g., existing proportional-integral-derivative (PID) controllers, to supplement and/or replace current plant control systems with model based predictive controls having optimization capabilities. More specifically, the model part 818 of the model process controller 850 according to an exemplary embodiment includes a nonlinear steady state model and one or more linear or nonlinear dynamic models. In addition, the steady state model and/or the dynamic model may each use adaptive, fuzzy, and/or NN modeling techniques, and/or first principle modeling techniques to model the complex, nonlinear multiphase flows and chemical reactions of the oxy-fuel power plant.

FIG. 4 depicts an exemplary embodiment of the oxy-fuel plant economic optimizer 952 of the FIG. 2. The oxy-fuel plant economic optimizer 952 is in communication with the power plant 100 of the FIG. 1. In an exemplary embodiment, the oxy-fuel plant economic optimizer 952 comprises a multivariable optimizer 912 which performs a total economics-based optimization of the power plant 100. More specifically, the multivariable optimizer 912 focuses on thermo-economic performance, emissions reduction and/or control, and life extension criteria for equipment associated with the power plant 100. The multivariable optimizer 912 uses nonlinear models or linear models to optimize the performance of the power plant. In an exemplary embodiment, the multivariable optimizer 912 uses nonlinear models to optimize the performance of the power plant.

To perform an economics-based optimization of the power plant 100, the multivariable optimizer 912 receives input parameters 102 and output parameters 104 of the power plant 100 through a cost calculation algorithm 918 and an income calculation algorithm 920, respectively, as shown in the FIG. 4. In an exemplary embodiment, the input parameters 102 include, but are not limited to, fuel flow, sorbent flow, air flow, water flow, limestone flow, solids circulation rate, and the like. The output parameters 104 include power generation rate, emissions credit, life extension, process steam (as an output product), $CO_2$ utilization, $CO_2$ capture (configured as negative income), $CO_2$ storage (configured as negative income), and the like.

The multivariable optimizer 912 receives outputs from the cost calculation algorithm 918 and the income calculation algorithm 920 to determine an optimized operating parameter solution for the power plant 100, based on constraints such as, for example, predetermined operating constraints 924, market constraints 926 and environmental constraints 928. Other constraints that may also be included in the FIG. 4 are constraints 930 associated with control actuators or hard constraints (emission limits), soft constraints that can be introduced into the cost objective function (e.g., trade penalties) resulting from national/state emission regulations or user specific trade penalties (relating to product insurance based on carbon dioxide quality in terms of purity or process steam quality in terms of pressure/temperature and purity).

In an exemplary embodiment, the cost calculation algorithm 918 sums up a set of products of predetermined individual cost factors Ci and individual inputs Xi of the input parameters 102, while the income calculation algorithm 920 sums a set of products of predetermined individual income factors Pi and individual outputs Yi of the output parameters 104. The individual cost factors Ci includes for example, auxiliary power cost, limestone cost, and fuel costs amongst others. The individual income factors Pi includes for example, emission credits, and life extension credits, amongst others.

The multivariable optimizer 912 applies the optimized operating parameter solution to the power plant 100 using a distributed control system 914 and an advanced process control (APC) data input/output system 916 as shown in FIG. 4. As a result, the power plant 100 is operated at an optimal total-economics-based operating point.

In one embodiment, the multivariable optimizer 912 can use any non-linear optimization solvers as long as it can work with a specific plant model and associated constraints. Fault information via fault detectors 922 can also be used in optimization. Faults can be associated with the feedback process, sensors, controllers, actuators, or other parts of the power plant. Typical process faults can include gas leakage, valve clogging, valve leakages or clogging, loss of pressure balance for the flue gas process or the water/steam process, poor combustion stability, pulverizer dysfunctions, ASU and GPU dysfunctions, dysfunction of the flue gas recirculation loop, furnace temperature/pressure being too high or too low, combustion emission limit violations, and the like. Fault information may be introduced into the optimization process via hybrid integer optimization.

Figure 5:
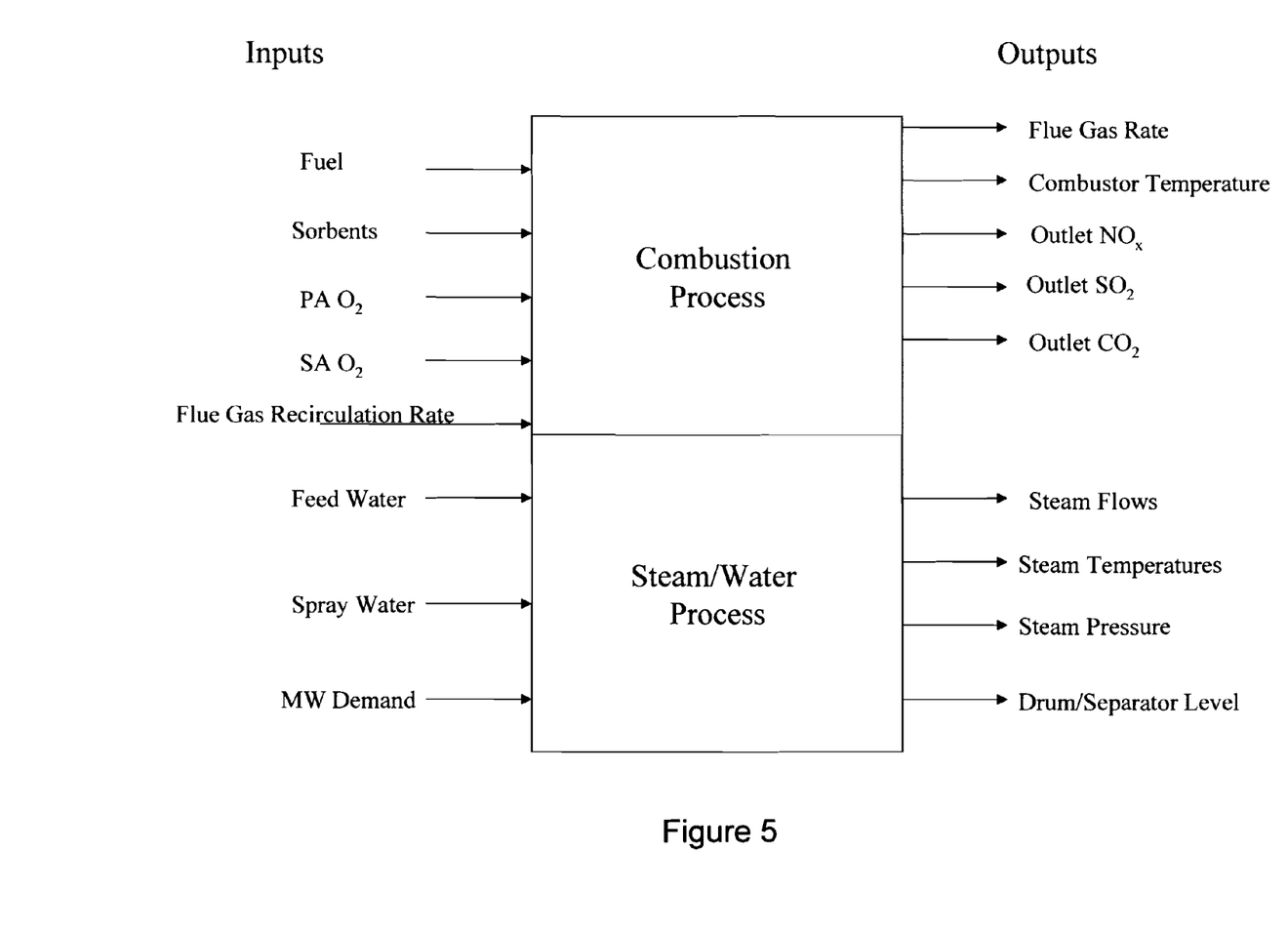
FIG. 5 shows the structure for an oxyfuel boiler model predictive controller, which can be a supervisory optimal controller using any oxyfuel boiler models.

The general input parameters 102 and output parameters 104 of an oxyfuel power plant 100 are shown in the FIG. 5. The FIG. 5 shows the structure for an oxyfuel boiler model predictive controller, which can be a supervisory optimal controller using any oxyfuel boiler models. As seen in the FIG. 5, the input parameters 102 and the output parameters 104 can be divided between the combustion parameters and the parameters related to the water/steam processes. General inputs for the combustion process are fuel, sorbents and PA-oxygen (primary oxygen flow) and SA-oxygen (secondary oxygen flow), while general outputs for the combustion process are flue gas rate, combustor temperatures, outlet masses of nitrogen oxides, sulfur dioxides and carbon dioxides.

General inputs to the water/steam processes in oxyfuel combustion are feed water, spray water and power demand in megawatts. General outputs of the stream/water processes in oxyfuel combustion are steam flows, steam temperatures, mass of steam and drum/separator levels and pressure part metal temperatures (if applicable).

The optimization problem for an oxyfuel boiler model process controller for the FIG. 4 can be mathematically stated as follows in the Equation (1):

$$J = \sum_{k=1}^{Np-1} (\hat{y}_k - y_{s,k})^T Q(\hat{y}_k - y_{s,k}) + \sum_{k=0}^{Nc-1} u_k^T R u_k + \Delta u_k^T S \Delta u_k] \quad (1)$$

subject to the operating conditions in the FIG. 4 and the following mathematical conditions $$u_{min} \leq u_k \leq u_{max} \quad (2)$$

$$\Delta u_{min} \leq \Delta u_k = u_k - u_{k-1} \leq \Delta u_{max} \quad (3)$$

$$y_{min} \leq y_k \leq y_{max} \quad (4)$$

where $\hat{y}$ is the predicted output vector, $y_s$ is the output state setpoint vector, u is input vector, $\Delta u$ is the control move vector, Np and Nc (with Nc<Np) are prediction and control horizons respectively, and Q(>0), R($\geq$0) and S(($\geq$0) are symmetric weighting matrices. J is the cost objective function for optimization. The quadratic cost function is used in a model predictive control formulation. The cost function can be linear cost function as well depending on the problem to be formulated for the given plant system, subsystem or components.

For non-linear models, the state estimators, if needed, can be extended Kalman filters (EKF) or unscented Kalman filters (UKF). The multivariable optimizer 904 can thus be any nonlinear optimizer as long as it can work with the unit specific models and estimators.

In summary, a process design and control optimization tool according to an exemplary embodiment includes a multivariable, non-linear tool which provides integrated, dynamic and steady state performance and controls design optimization for a oxy-fuel power plant. As a result, plant emissions are substantially reduced and/or effectively minimized while overall economic plant efficiency is substantially improved, resulting in lower overall operating costs.

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A control system for optimizing an oxy-fuel power plant, the control system comprising:
an optimizer in communication with the oxy-fuel power plant; the oxy-fuel power plant being operative to recycle carbon dioxide from a flue gas stream to a boiler;
a control platform; the control platform being operative to control the oxy-fuel power plant; and
a simulator; the simulator being operative to simulate performance of the oxy-fuel power plant; where the optimizer farther optimizes an income calculation algorithm; the income calculation algorithm providing an income input to the optimizer based on a plurality of input parameters of the oxy-fuel power plant; and a cost calculation algorithm which provides a cost input to the optimizer based on a plurality of output parameters of the oxy-fuel power plant, wherein the optimizer determines an optimized operating parameter solution based upon at least one of the income input and the cost input, and supplies the optimized operating parameter solution to the oxy-fuel power plant.

2. The control system of claim 1, wherein the plurality of input parameters comprises at least one of a fuel flow, a sorbent flow, an air flow, a water flow, a limestone flow and a solids circulation rate, and the plurality of output parameters comprises at least one of a power generation rate, carbon dioxide utilization, carbon dioxide capture, carbon dioxide storage, flue gas rate, combustor temperatures, outlet masses of nitrogen oxides, sulfur dioxides and carbon dioxides.

3. The control system of claim 1, wherein the income calculation algorithm provides the income input to the optimizer further based on at least one of an emissions credit and a life extension credit.

4. The control system of claim 1, wherein the cost calculation algorithm provides the cost input to the optimizer further based on at least one of an auxiliary power cost, limestone cost and fuel cost.

5. The control system of claim 1, wherein the optimizer is a multivariable optimizer that performs an economics-based optimization of the oxy-fuel power plant.

6. The control system of claim 1, wherein the control platform comprises a plurality of controllers and wherein the simulator comprises a plurality of simulators.

7. The control system of claim 6, wherein at least one controller of the plurality of controllers is a model predictive controller.

8. The control system of claim 7, wherein the model predictive controller is a nonlinear model predictive controller.

9. The control system of claim 8, wherein the nonlinear model predictive controller comprises a model part; a simulator part operably connected to the model part; and an optimizer part operably connected to the model part.

10. The control system of claim 9, wherein the model part comprises at least one of a steady state model, a dynamic model, an adaptive model, a fuzzy model and a neural network model, the simulator part comprises a reduced order modeling simulator, and wherein the optimizer part comprises at least one of a multivariable optimizer, a gradient based optimizer, a stochastic optimizer, a genetic algorithm optimizer or a nested partition optimizer.

11. The control system of claim 8, wherein the nonlinear model predictive controller comprises an extended Kalman filter or an unscented Kalman Filter.

12. The control system of claim 1, wherein the optimizer determines an optimized operating parameter solution based upon at least one of the income input and the cost input, and supplies the optimized operating parameter solution to the control platform of the oxy-fuel power plant.

13. The control system of claim 1, wherein the optimizer computes target values and supplies these target values to the control platform for real time execution.

14. The control system of claim 1, wherein the plant optimizer retrieves online data from the control platform and processes the online data for use in prediction in a process model.

15. The control system of claim 1, where the optimizer functions to optimize an optimization problem mathematically stated in the Equations (1):

$$J = \sum_{k=1}^{N_p-1} (\hat{y}_k - y_{s+k})^T Q(\hat{y}_k - y_{s+k}) + \sum_{k=0}^{N_c-1} u_k^T R u_k + \Delta u_k^T S \Delta u_k] \quad (1)$$

subject to a set of mathematical conditions represented by Equations (2), (3) and (4)

$$u_{min} \leq u_k \leq u_{max} \quad (2)$$

$$\Delta u_{min} \leq \Delta u_k = u_k - u_{k-1} \leq \Delta u_{max} \quad (3)$$

$$y_{min} \leq y_k \leq y_{max} \quad (4)$$

where $\hat{y}$ is the predicted output vector, $y_s$ is the output state setpoint vector, u is input vector, $\Delta u$ is the control move vector, Np and Nc (with Nc<Np) are prediction and control horizons respectively, Q(>0), R(≥0) and S(≥0) are symmetric weighting matrices and J is the cost objective function for optimization.

16. The control system of claim 1, wherein the optimizer comprises a plurality of optimizers.

17. The control system of claim 1, wherein the optimizer comprises a first optimizer for a flue gas dryer, a second optimizer for an electrostatic precipitator and a third optimizer for a flue gas condenser.

18. The control system of claim 1, wherein the control platform comprises a plurality of controllers.

19. The control system of claim 1, wherein the control platform controls an air separation unit, a boiler, a flue gas dryer, an electrostatic precipitator and a flue gas condenser, and a turbine generator.

20. The control system of claim 1, wherein the simulator comprises a simulator for an air separation unit and a simulator for a boiler.

21. The control system of claim 1, wherein the optimizer determines an optimized operating parameter solution based upon at least one of income input and cost input, and supplies the optimized operating parameter solution to the control platform of the oxy-fuel power plant.

22. The method of claim 1, wherein the optimizing comprises optimizing a cost objective function by linear equations or forms other than a quadratic form of an equation.

\* \* \* \* \*